J. W. KIMMONS.
HARROW.
APPLICATION FILED JULY 25, 1911.
1,012,086.
Patented Dec. 19, 1911.
2 SHEETS—SHEET 1.
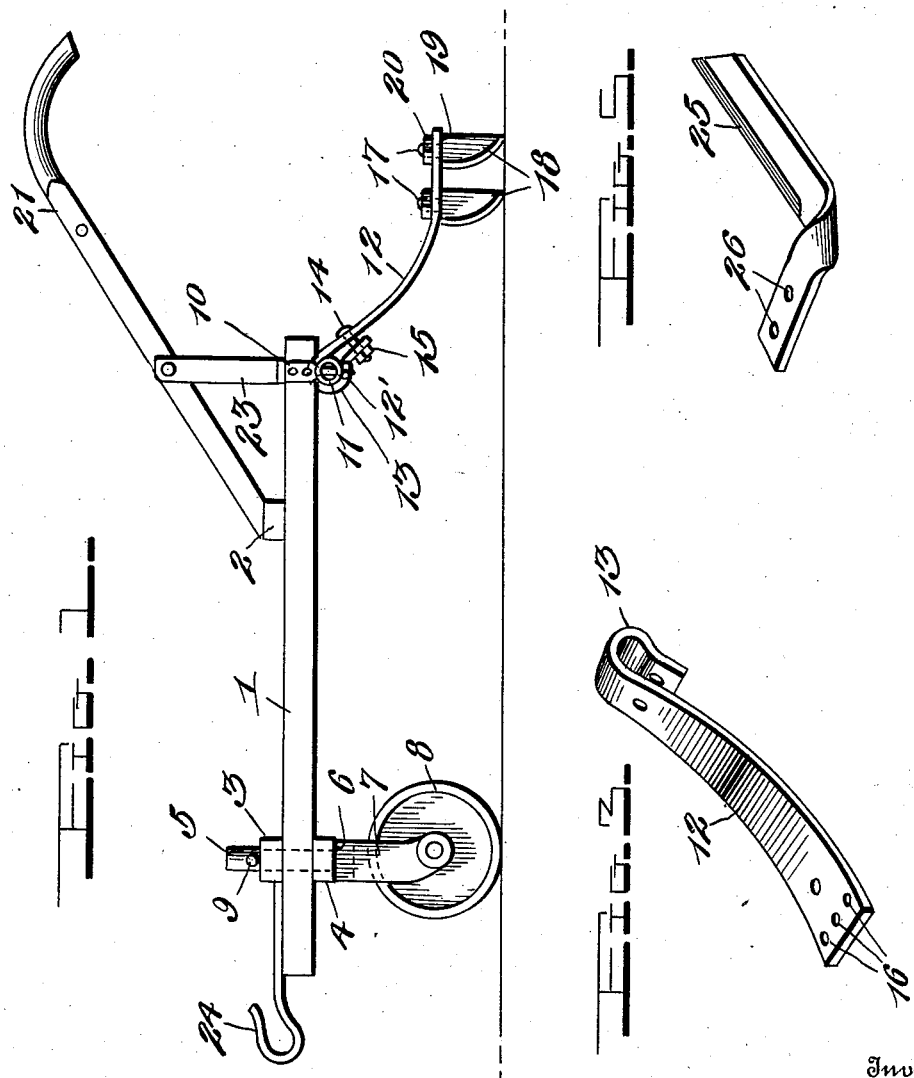
Witnesses
Inventor
J. W. Kimmons,
By Watson E. Coleman.
Attorney

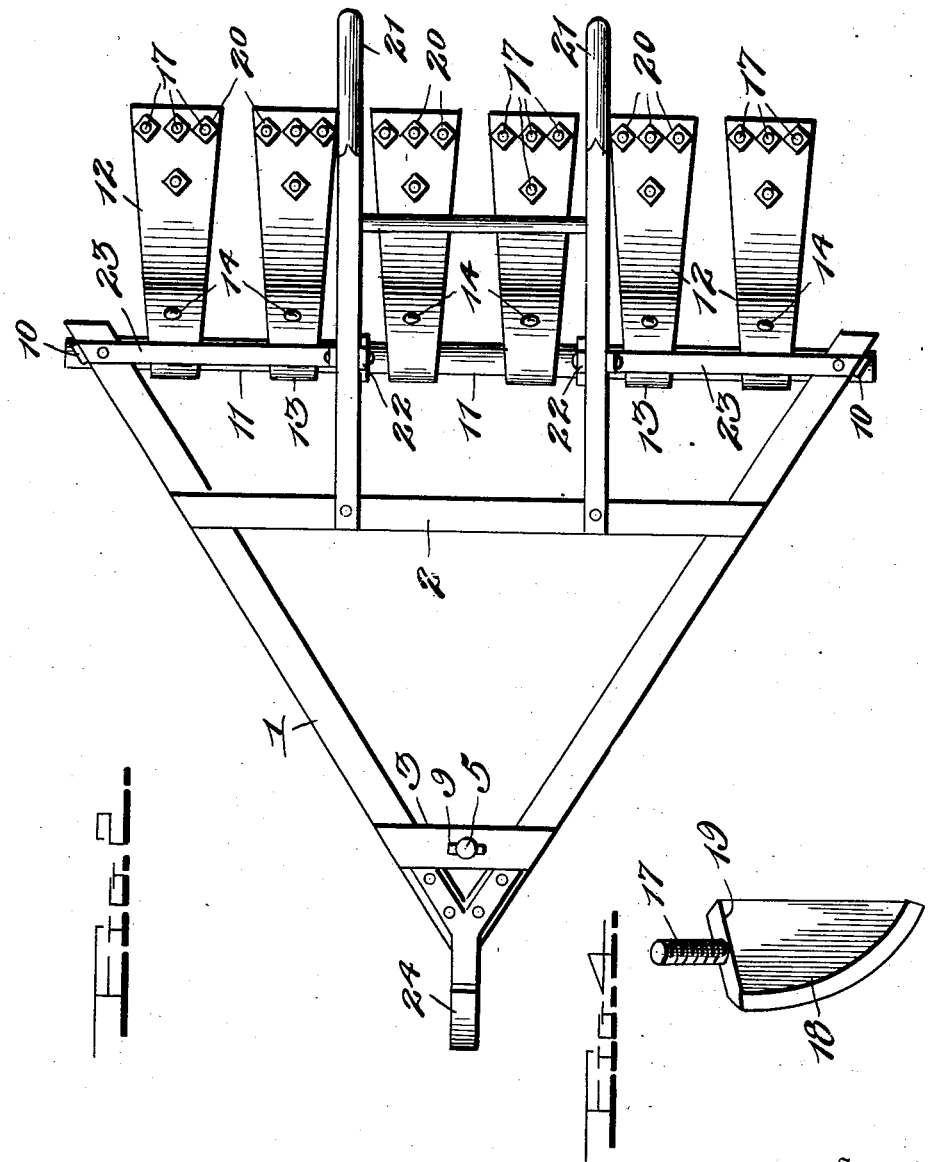

UNITED STATES PATENT OFFICE.

JOEL W. KIMMONS, OF LOWELL, ARKANSAS.

HARROW.

1,012,086.  Specification of Letters Patent.  Patented Dec. 19, 1911.

Application filed July 25, 1911. Serial No. 640,387.

*To all whom it may concern:*

Be it known that I, JOEL W. KIMMONS, a citizen of the United States, residing at Lowell, in the county of Benton and State of Arkansas, have invented certain new and useful Improvements in Harrows, of which the following is a specification, reference being had to the accompanying drawings.

My invention relates to new and useful improvements in agricultural implements and more particularly to a harrow, and my object is to provide a device of this character with means for the interchanging of various forms of teeth.

A further object of the invention resides in the provision of a plurality of spring members to which the various teeth may be attached.

Still another object of the invention resides in the provision of a device which is extremely simple and durable in construction, inexpensive to manufacture, and one which is very effective in operation.

With these and other objects in view, my invention consists in the novel features of construction, combination and arrangement of parts as will be hereinafter referred to and more particularly pointed out in the specification and claims.

In the accompanying drawings forming a part of this application, Figure 1 is a side elevation of the device. Fig. 2 is a top plan view thereof. Fig. 3 is a detail perspective view of one of the spring shanks. Fig. 4 is a similar view of one of the harrow teeth, and, Fig. 5 is a perspective view of one of the tools which may be interchanged for the harrow teeth.

In carrying out my invention, I shall refer to the drawings in which similar reference characters designate corresponding parts throughout the several views and in which 1 indicates a frame, the bars of which converge at their forward ends, and are braced at their rear ends by means of the transverse bracing bar 2. The forward end of the frame 1 has mounted thereon, the upper and lower cross bars 3 and 4, respectively, and extending through said bars 3 and 4 and revolubly mounted therein, is an arm or the like 5, the lower portion of which is provided with a shoulder 6 and is bifurcated, as shown at 7, to rotatably receive therebetween, a guide wheel or roller 8. A pin 9 extending through said arm above the upper bar 3, prevents the displacement of said pin from the frame, and as said arm is disposed so as to revolve freely in said bars, the same will be readily disposed toward any angle to which the frame is guided.

The side bars of the frame converging, as described, at their forward ends, form a substantial V in design, and to the ends of said side bars, are secured the straps 10, the free ends of which extend beyond the ends of said side bars and are threaded. An additional transverse bar 11 having openings adjacent its ends, is also provided and applied to the frame 1 so that the protruding or projecting ends of the straps 10 extend through the openings therein, and when so positioned, the nuts 12' are applied to the threaded ends of said straps to securely retain said bar on the frame. This bar may be circular or polygonal in cross section, as desired, and clamped to said cross bar 11, is a plurality of spring shanks 12, said shanks being spaced at regular intervals throughout the length of the bar. These shanks are somewhat arcuately designed, the one end of which being bent, as shown at 13, whereby the same may be engaged around said bar, and extending through said shank 13 and the bent portion, is a clamping bolt 14, the end of which has engaged therewith, a nut 15, so that said spring shanks may be readily applied to the cross bar 11 and clamped so as to be disposed at any desired angle thereto. In view of the manner in which these spring shanks are adapted to be clamped to the cross bar, it will be seen that when said cross bar is polygonal in cross section, the same may be secured thereto so as to be more readily retained at any desired angle, but it will be also appreciated that the same may be securely clamped to a bar which is circular in cross section. Said spring shanks 12 are provided adjacent their free ends with a plurality of openings 16 which are adapted to receive therein the shanks 17 of the harrow teeth 18. These harrow teeth are provided with shoulders 19 at the junction of the shanks thereof and the blade proper so that when said shanks 17 are extended through said openings, the shoulders 19 will limit the movement thereof upwardly. Said shanks are also threaded at their free ends, to be readily engaged by the nuts 20, whereby the same may be securely retained to said shanks. Each spring shank being provided with a plurality of openings, it will be appreciated that a plurality of harrow teeth may be applied thereto, and in this connection, it will also be readily understood that the openings may be arranged in any desired manner so as to pulverize the soil readily as the frame is passed thereover.

Secured to the transverse bracing bar 2 of the frame, are the forward ends of a pair of handle members 21, said handle members being braced intermediate of their ends by the vertical bracing bars 22, the lower ends of which are engaged with the bar 11 and are also braced by the bars 23 which extend from the side bars of the frame 1. In this manner, it will be seen that the device is one which may be readily driven manually, and in order to provide for the propulsion of the device by means of draft, while an operator grasps the handle members, the upwardly curved hook member 24 is provided at the forward end of the frame 1, to which may be attached a swingle-tree or the like, for the purpose described. When in use and propelled by means of draft, it will be appreciated that the operator or driver may grasp the handle members 21 so as to force downwardly thereon and in turn, force the teeth of the harrow into engagement with the soil so as to pulverize the same as the device is propelled.

I particularly describe this device as being used in connection with harrow teeth, but it will also be understood that other forms of ground-treating implements may be substituted therefor, and in the drawing, I have shown a weeder blade or the like 25, the shank of which is bent at right angles to the general trend of the blade and provided with openings 26. In applying these weeder blades, bolts or the like (not shown) may be inserted through these openings 26 and the openings 16 in said spring shanks and nuts (also not shown) applied to said bolts to securely retain said blades thereto, and in this position, the blades are adapted to be disposed between the spring shanks 12 so as to readily cut the young vegetation from the surrounding stalks in the field.

Although I have only shown this one form of ground-treating implement which may be substituted for the harrow teeth, it will be readily understood that many forms of teeth or implements may be provided and interchanged, as desired. In this connection, it must also be stated that although I have particularly described the various features of the device, various changes in form, proportion and in the minor details of construction may be resorted to without departing from the spirit of the invention.

From the foregoing, it will be seen that I have provided a harrow wherein various forms of teeth or other ground-treating implements may be interchanged with little or no difficulty, whatsoever. It will further be seen that by providing the spring shanks to which the teeth and other implements may be secured, the same will yield to the pressure applied to the handles by the operator of the machine. It will still further be seen that by providing the spring shanks with clamping means, as described, the same may be disposed at various angles with respect to the ground. It will still further be seen that by providing a guide wheel of the form disclosed and described, the same will readily turn and be guided to the various angles desired, such as an ordinary caster used in connection with furniture. It will still further be seen that my device is of very simple and durable construction, is inexpensive to manufacture, and is one which will be very effective and useful in operation.

What I claim is:—

1. A harrow of the class described, comprising a frame, a guide wheel mounted at the forward end thereof, a cross bar at the rear end thereof, a plurality of spring shanks carried on said cross bar, means to clamp said shanks to said bars so as to dispose the same at various angles thereon, a plurality of ground-treating implements, and means to removably secure said implements to said spring shanks.

2. A harrow of the class described, comprising a frame, a guide wheel mounted on the forward end thereof, a cross bar at the rear end thereof, a plurality of spring shanks having one of their ends bent to engage said cross bar, means to clamp said bent ends on the bar, the free ends of said shanks being provided with a plurality of openings therein, a plurality of ground-treating implements, and means to removably secure said implements in the openings of said spring shanks.

3. A harrow of the class described, comprising a frame, a guide wheel mounted on the forward end thereof, a cross bar at the rear end of said frame, a plurality of arcuately designed spring shanks having their upper ends bent into engagement with said bar, means to clamp the bent ends of the shanks on the bar to secure said shanks at various angles thereto, said shanks having their free ends provided with a plurality of openings, a plurality of ground-treating implements adapted to be entered through the openings of said shanks, and means to clamp said implements on the shanks.

In testimony whereof I hereunto affix my signature in the presence of two witnesses.

JOEL W. KIMMONS.

Witnesses:
E. T. PINKSTON,
R. J. ROBBINS.

Copies of this patent may be obtained for five cents each, by addressing the "Commissioner of Patents, Washington, D. C."